(12) United States Patent
Rowsell et al.

(10) Patent No.: US 8,900,348 B2
(45) Date of Patent: Dec. 2, 2014

(54) ADSORPTION OF VOLATILE ORGANIC COMPOUNDS DERIVED FROM ORGANIC MATTER

(75) Inventors: Elizabeth Rowsell, Hampton (GB); Andrew William John Smith, Reading (GB); Stephen Poulston, Ascot (GB)

(73) Assignee: Johnson Matthey Public Limited Company, London (GB)

( * ) Notice: Subject to any disclaimer, the term of this patent is extended or adjusted under 35 U.S.C. 154(b) by 185 days.

(21) Appl. No.: 13/381,776

(22) PCT Filed: Jul. 2, 2010

(86) PCT No.: PCT/GB2010/051095
§ 371 (c)(1),
(2), (4) Date: Mar. 19, 2012

(87) PCT Pub. No.: WO2011/001186
PCT Pub. Date: Jan. 6, 2011

(65) Prior Publication Data
US 2012/0160100 A1    Jun. 28, 2012

(30) Foreign Application Priority Data

Jul. 2, 2009  (GB) .................................. 0911478.6

(51) Int. Cl.
| | | |
|---|---|---|
| *B01J 20/18* | (2006.01) | |
| *A23B 7/148* | (2006.01) | |
| *A23B 7/152* | (2006.01) | |
| *B01D 53/04* | (2006.01) | |
| *B01J 20/32* | (2006.01) | |
| *B01J 20/34* | (2006.01) | |
| *A23B 7/157* | (2006.01) | |
| *A23L 3/3427* | (2006.01) | |
| *A23L 3/3445* | (2006.01) | |
| *B01J 20/02* | (2006.01) | |
| *B01J 20/28* | (2006.01) | |
| *B01J 20/30* | (2006.01) | |

(52) U.S. Cl.
CPC ................ *A23B 7/152* (2013.01); *B01D 53/04* (2013.01); *B01J 20/32* (2013.01); *B01J 20/34* (2013.01); *A23B 7/157* (2013.01); *A23L 3/3427* (2013.01); *A23L 3/3445* (2013.01); *A23V 2002/00* (2013.01); *B01J 20/0225* (2013.01); *B01J 20/186* (2013.01); *B01J 20/28014* (2013.01); *B01J 20/3078* (2013.01); *B01J 20/3204* (2013.01); *B01J 20/3236* (2013.01); *B01J 20/3408* (2013.01); *B01J 20/3483* (2013.01); *B01J 20/28004* (2013.01); *B01J 20/2805* (2013.01); *Y10S 95/90* (2013.01)
USPC .................... 95/141; 95/144; 95/900; 502/74

(58) Field of Classification Search
CPC ....... A23B 7/148; A23B 7/152; A23L 3/3427; B01J 20/186; B01J 20/32; B01J 20/34; B01D 53/04; B01D 2253/26; B01D 2257/708
USPC .................. 95/141, 143, 144, 148, 900, 902; 423/245.1, DIG. 22; 502/71, 74, 77; 562/608, 609; 585/820, 826; 426/321, 426/654
See application file for complete search history.

(56) References Cited

U.S. PATENT DOCUMENTS

| | | | |
|---|---|---|---|
| 4,331,693 | A | 5/1982 | Wojciechowski et al. |
| 4,762,722 | A | 8/1988 | Izumimoto et al. |
| 6,319,484 | B1 | 11/2001 | Shore et al. |
| 6,837,917 | B2 | 1/2005 | Karwacki et al. |
| 8,480,794 | B2 | 7/2013 | Ilkenhans et al. |
| 2001/0031299 | A1 | 10/2001 | Full et al. |
| 2002/0086793 | A1 | 7/2002 | Labarge et al. |

FOREIGN PATENT DOCUMENTS

| | | | |
|---|---|---|---|
| DE | 44 33 120 | A1 | 3/1995 |
| EP | 0 261 422 | A2 | 3/1988 |
| EP | 0 261 422 | A3 | 3/1988 |
| EP | 467668 | A1 | 1/1992 |
| EP | 0 755 714 | A2 | 1/1997 |
| EP | 0 755 714 | A3 | 1/1997 |
| EP | 0 818 238 | A1 | 1/1998 |
| EP | 0 938 925 | A1 | 9/1999 |
| EP | 0 947 236 | A1 | 10/1999 |
| EP | 1 348 640 | A2 | 10/2003 |
| EP | 1 525 802 | A1 | 4/2005 |
| GB | 2 163 637 | A | 3/1986 |
| GB | 2 252 968 | A | 8/1992 |
| JP | 60-201252 | A | 10/1985 |
| JP | 2-233381 | A | 9/1990 |
| JP | 2-261341 | A | 10/1990 |
| JP | 3-280827 | A | 12/1991 |
| JP | 6-047235 | A | 2/1994 |
| JP | 6-210165 | A | 8/1994 |
| JP | 07-080291 | | 3/1995 |

(Continued)

OTHER PUBLICATIONS

Leon A. Terry et al., "Development of new palladium-promoted ethylene scavenger," *Postharvest Biology and Technology* 45 (2007) 214-220.

(Continued)

*Primary Examiner* — Frank Lawrence
(74) *Attorney, Agent, or Firm* — Young & Thompson

(57) ABSTRACT

The present invention relates to the use of palladium doped ZSM-5 to adsorb volatile organic compounds (VOCs) derived from organic matter, wherein the Si:Al ratio of the ZSM-5 is less than 5 or equal to 100:1, and wherein the palladium doped ZSM-5 is used in an environment comprising less than 10 vol % of oxygen.

26 Claims, 1 Drawing Sheet

(56) References Cited

FOREIGN PATENT DOCUMENTS

| | | | |
|---|---|---|---|
| JP | 08173512 | A | 7/1996 |
| JP | 08308917 | A | 11/1996 |
| JP | 09-024272 | | 1/1997 |
| JP | 09249824 | A | 9/1997 |
| JP | 9-313935 | A | 12/1997 |
| JP | 10-249209 | A | 9/1998 |
| JP | 2000-4783 | A | 1/2000 |
| JP | 2005-054086 | | 3/2005 |
| RU | 2391446 | C2 | 5/2009 |
| RU | 2007140558 | A | 5/2009 |
| WO | WO-02/069732 | A2 | 9/2002 |
| WO | WO-2007/052074 | A2 | 5/2007 |

OTHER PUBLICATIONS

M. V. Rama et al., "Controlled-Atmosphere Storage: Effect on Fruits and Vegetables," *Encyclopedia of Food Sciences and Nutrition*, 2$^{nd}$ Edition, 2003, pp. 1607-1615.

British Search Report dated Oct. 26, 2009, from British Patent Application No. 0911478.6.

International Search Report dated Oct. 20, 2010, from International Application No. PCT/GB2010/051095.

Russian Chemical Encyclopaedia, 1998, pp. 51-64.

Chemical Encyclopedia Dictionary, 2000, pp. 7, 8 and 12.

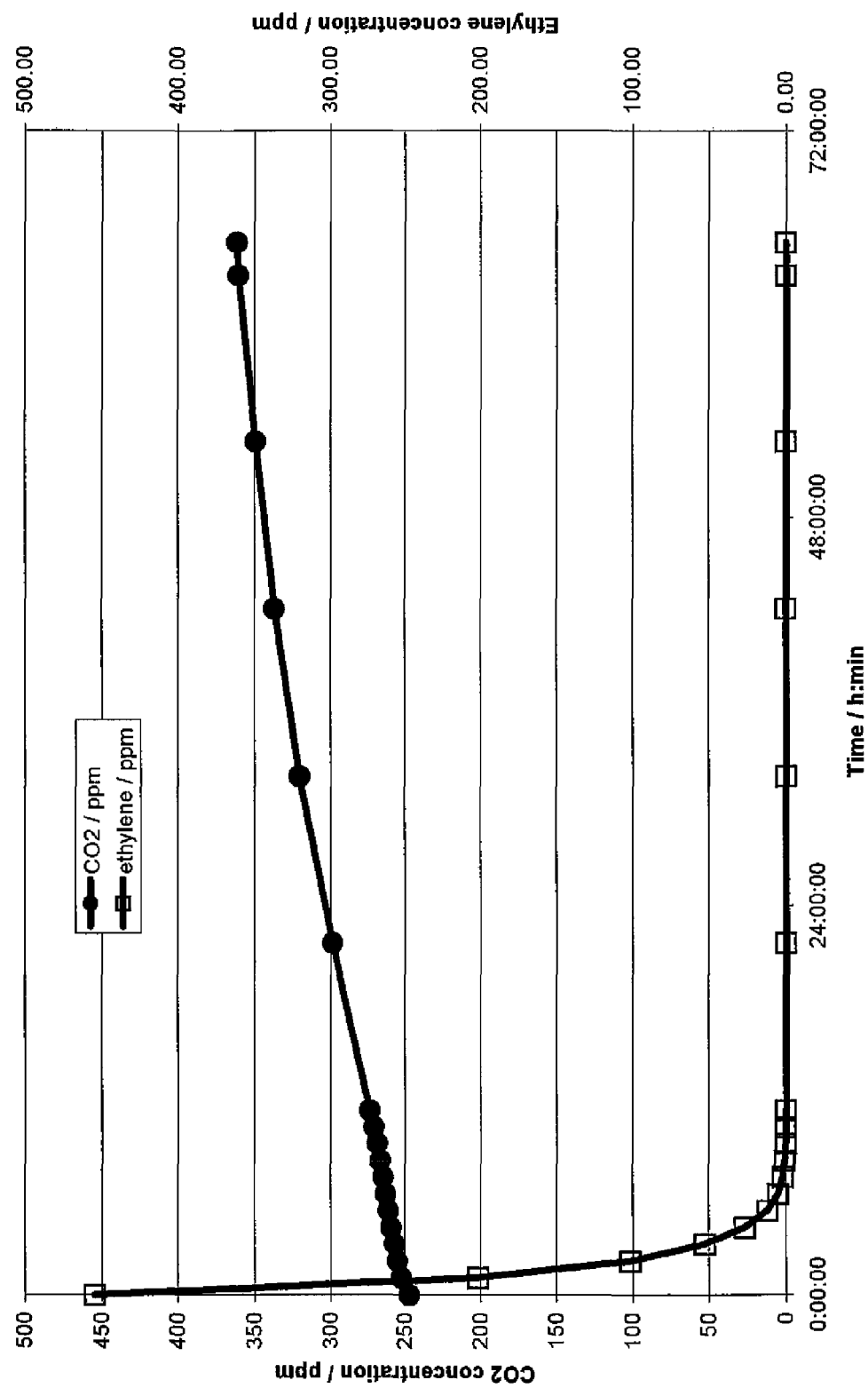

ADSORPTION OF VOLATILE ORGANIC COMPOUNDS DERIVED FROM ORGANIC MATTER

CROSS-REFERENCE TO RELATED APPLICATIONS

This application is the U.S. National Phase application of PCT International Application No. PCT/GB2010/051095, filed Jul. 2, 2010, and claims priority of British Patent Application No. 0911478.6, filed Jul. 2, 2009, the disclosures of both of which are incorporated herein by reference in their entireties for all purposes.

FIELD OF THE INVENTION

This invention relates to the adsorption of volatile organic compounds (VOCs) derived from organic matter in an environment which contains low or no oxygen. More particularly, the organic matter can be perishable organic goods, such as food.

BACKGROUND OF THE INVENTION

Controlled atmosphere storage of fresh produce utilizes high levels of $CO_2$ and reduced oxygen to increase the shelf life of the product. Modified atmosphere packaging is used to enhance the lifetime and/or the quality of food by reducing the amount of oxygen (towards zero) in the atmosphere compared to air. Fresh produce tends to be packed under an equilibrium modified atmosphere which uses high levels of $CO_2$ and reduced levels of oxygen and which allows a reduced respiration rate.

VOCs include a range of compounds that are derived from organic matter. One example of a VOC derived from organic matter is ethylene, a plant hormone that causes ripening, whilst another example is trimethylamine, a gas commonly given off by fish as it decomposes.

The removal of VOCs derived from organic matter is of interest for a variety of applications. The adsorption of ethylene can prevent undesired ripening and softening, loss of colour, loss of leaves and sprouting to occur in fruit and vegetables, it is also known to prevent other food and horticultural products from perishing prematurely, and can help eliminate unpleasant smells. Various methods have been used to oxidise or combust VOCs using Pt on $Al_2O_3$ or $KMnO_4$. However, although these systems are efficient for the removal of VOCs, they have disadvantages associated with their use. Pt on $Al_2O_3$ works by catalytically combusting the ethylene at elevated temperatures, therefore Pt on $Al_2O_3$ needs to be used in a heated unit separate from the source of the VOCs (see for example GB 2 163 637 A and U.S. Pat. No. 4,331,693). $KMnO_4$ does not appear to remove VOCs efficiently from humid environments. Since organic matter, such as food, cannot be heated without being altered and inherently exudes moisture such systems are unsuitable for use in removing VOCs derived from organic matter.

Other methods used to remove VOCs are suited for use at lower temperatures; these include the use of high surface area supports, usually in conjunction with a promoter, for the adsorption of VOCs. For example, JP 2-261341 relates to the adsorption of ethylene from refrigerated storage compartments, JP 2-233381 relates to an ethylene adsorption film and JP 2000-004783 relates to a combined ethylene adsorber, deodoriser and anti-bacterial product for use in a refrigerator. Specific support materials are not disclosed in any of these publications, instead activated carbon and metal oxides are stated as being generally suitable for use as supports. GB 2 252 968 A relates to an adsorber comprising a sepiolite in combination with a zeolite, and optionally a metal selected from the platinum group metals, the iron group metals, group I metals, group VII metals and the rare earth metals. The most preferred zeolites for use in the invention described in GB '968, are silicalites because their alumina content is almost zero.

WO2007/052074 relates to the use of palladium doped ZSM-5 to adsorb VOCs derived from organic matter. WO2007/052074, however, does not describe the use of the palladium doped ZSM-5 in an environment comprising low or no gaseous oxygen.

SUMMARY OF THE INVENTION

In accordance with a first aspect of the present invention, there is provided the use of palladium doped ZSM-5 to adsorb VOCs derived from organic matter, wherein the Si:Al ratio of the ZSM-5 is less than or equal to 100:1, and wherein the palladium doped ZSM-5 is used in an environment comprising less than 10 vol % of oxygen. Optionally the Si:Al ratio of the ZSM-5 is from 22:1 to 28:1.

BRIEF DESCRIPTION OF THE DRAWINGS

In order that the invention may be more fully understood the following non-limiting Examples are provided by way of illustration only and with reference to the accompanying drawings in which:

FIG. 1 is a graph showing ethylene adsorption over time by ZSM-5 doped with palladium in an environment comprising about 8.4 vol % oxygen.

DETAILED DESCRIPTION OF THE INVENTION

At least a proportion of the adsorbed VOCs may be converted into secondary compounds after adsorption onto the doped ZSM-5.

In one embodiment the organic matter consists of perishable organic goods, such as items of food and horticultural produce. The items of food may comprise fruit and/or vegetables. The horticultural produce may comprise plants and/or cut flowers.

In another embodiment the organic matter comprises refuse. Such refuse may include kitchen refuse such as waste food, which produces unpleasant odours whilst decomposing.

The organic matter from which the VOCs are derived may be contained within a storage container or package, such that the doped ZSM-5 has a closed or semi-enclosed environment within which to adsorb the VOCs. In the case of perishable organic goods the storage container or package is likely to be the container or package within which the goods are contained, e.g. crates used to store the goods when in transit or the packaging within which the goods are kept when on display prior to purchase. In another embodiment, the doped ZSM-5 is incorporated into, or into part of, the storage container or package itself. In a further embodiment, the doped ZSM-5 is incorporated into a label comprising a substrate for insertion and retention within a storage container or package.

If the perishable organic goods comprise items of food, the doped ZSM-5 may be packaged in a way to prevent direct contact with the food, e.g. behind a gas permeable barrier layer. The gas permeable barrier layer might form part of a sachet or label enclosing powdered doped ZSM-5 or the gas permeable layer could be affixed on top of a layer of ink comprising doped ZSM-5. The ink could be fixed to an internal surface of the storage container or package by printing, casting, roller application, brushing, spraying or like techniques. Additionally as the adsorption capacity of doped ZSM-5 is moderately sensitive to the presence of water, the doped ZSM-5 may be packaged with a water adsorbing material, such as silica gel.

If, however, the source of VOCs is refuse, the storage container or package may be a refuse receptacle.

Commonly the doped ZSM-5 will be particulate and may be loosely packaged, such as within a sachet (see above). Alternatively, the particulate may be associated with another object, such as by being incorporated into a storage container, incorporated into a packaging material (for example, a plastic such as PET), incorporated into an ink (see above) or simply coated onto or in another object, e.g. a ceramic or metal monolith, such as those used as catalyst carriers. Other forms of low pressure-drop substrates, such as those commonly used as catalyst carriers, may also be used. In another embodiment the doped ZSM-5 is in the form of extrudates, pellets, tablets, grains or granules. The ZSM-5 may be doped before or after being formed into such extrudates, pellets, tablets, grains or granules.

Other methods of using the present invention may be used in appropriate circumstances.

One advantage associated with this invention is that the VOCs can be adsorbed at relatively low temperatures, such as in the range of from −10° C. to 50° C., more commonly from 0° C. to 40° C. For example, the temperature range may be from about 0° C. to about 35° C. or about 0° C. to about 30° C. This enables the doped ZSM-5 to be used in the environment within which the organic matter is commonly found, e.g. refrigerators or at ambient temperature, without requiring complex heating and gas recirculation equipment to be used. Nonetheless, where a particular application allows for heating and gas recirculation equipment to be used (e.g. a gas conditioning system) the doped ZSM-5 may also be operated at an elevated temperature, e.g. above 60° C.

In one embodiment the VOCs comprise ethylene. Ethylene is a gaseous hormone released by plants that can cause plants to wilt and fruits to ripen. The removal of VOCs produced by plants can delay these processes enabling food and horticultural produce to be kept in transit and/or in storage for longer without accelerating perishing. Therefore, a particular application of this invention is to industries that produce, ship, export and buy food and horticultural produce. Initial tests have suggested that, unlike prior art methods, the use of an adsorber according to this invention could enable the shelf life of post-climacteric fruit to be extended (Terry L, Ilkenhans T, Poulston S, Rowsell E and Smith A W J, *Postharvest Biology and Technology* 45 (2007) 214-220). That is, even after the climacteric respiratory rise has been initiated, fruit may be prevented from ripening further (or at least the rate of ripening slowed) using palladium doped ZSM-5 to adsorb ethylene.

In another embodiment the VOCs comprise formaldehyde and/or acetic acid. Formaldehyde and acetic acid are malodorous chemicals that are often found in the home. Formaldehyde may be released from pressed bonded wood products, such as plywood, but is also found in dyes, textiles, plastics, paper products, fertilizer, and cosmetics. Acetic acid may be released from kitchen waste and animal waste. Therefore, one potential application of this invention is to the removal of malodours from the domestic environment.

Another point of interest is that, although there is some loss of activity in the palladium doped ZSM-5 once they have been exposed to water, they are still able to function efficiently when "wet". As food and horticultural produce are usually stored in humid environments, this feature is also advantageous to the relevant industries.

Methods of manufacturing palladium doped ZSM-5 are known to the skilled chemist, and include the use of a variety of palladium salts, such as $Pd(NO_3)_2$, $Pd(OAc)_2$, $PdCl_2$, palladium oxalate, (tetraamine palladium hydrogen carbonate), (tetraamine palladium hydroxide) and (tetraamine palladium acetate). Commonly the ZSM-5 will be calcined after impregnation with at least one palladium salt, however, for some applications this may not be necessary. Samples of palladium doped ZSM-5 that are calcined will comprise at least partially oxidised palladium.

The palladium itself can comprise from 0.1 wt % to 10.0 wt % based on the total weight of the ZSM-5, optionally from 0.5 wt % to 5.0 wt % based on the total weight of the ZSM-5.

The doped ZSM-5 may be conveniently used in a controlled atmosphere or modified atmosphere environment. In one embodiment, the level of oxygen in these environments is present in a range between ≥5 vol % and <10 vol %. For example, the level of oxygen may be about 1 vol %, about 2 vol %, about 3 vol %, about 4 vol %, about 5 vol %, about 6 vol %, about 7 vol %, about 8 vol % or about 9 vol %. In another embodiment, the level of oxygen is substantially 0 vol %. The balance of the gas composition may comprise an inert gas (such as nitrogen), optionally carbon dioxide and/or optionally carbon monoxide.

In one embodiment, the doped ZSM-5 is effective to adsorb the VOCs to a level of less than or equal to 0.10 ppm, optionally to a level of less than or equal to 0.05 ppm. In another embodiment, the doped ZSM-5 is effective to adsorb substantially all of the VOCs i.e. no detectable amount of the VOCs remains.

Another advantage of this invention is that the doped ZSM-5 may be used continuously for VOC removal for an extended period of time, e.g. several days, (the actual time depending upon the environment within which it is used). Furthermore, after use the ZSM-5 may be heated to 250° C. for 30 minutes in air to release the VOCs adsorbed on the ZSM-5 and any secondary compounds present, thus regenerating the palladium doped ZSM-5 for further use. This enables the palladium doped ZSM-5 to be used for extended periods of time, then removed from the source of VOCs, regenerated and re-used. As the regeneration process is neither lengthy nor costly, this means the doped ZSM-5 is a cost effective product for VOC removal. It is worth noting that, by contrast, regeneration of $KMnO_4$ is not possible as the material decomposes on heating to $K_2O$ and manganese oxide(s).

In order to identify the time when the doped ZSM-5 has reached its VOC adsorption capacity and therefore needs regenerating, a VOC indicator may be included for use with the doped ZSM-5. Suitable indicators include the palladium based ethylene indicator disclosed in patent application JP 60-201252.

EXAMPLES

Example 1

Preparation of Doped Supports

The doped support, also known as an adsorber, was prepared using the incipient wetness impregnation method. Typically 20 g of the support (e.g. the hydrogen form of the zeolite) was impregnated with the nitrate salt or chloride salt of palladium, and then dried at 110° C. before being calcined in air at 500° C. for 2 hrs.

Example 2

Ethylene Adsorption Measurements

Measurements were carried out in a plug flow reactor at 21° C. with 0.1 g doped support of particle size 250-355 μm with a flow rate of 50 ml/min of gas comprising varying concentrations of $O_2$, 200 ppm $C_2H_4$, ~80% relative humidity and balance nitrogen. The results of this experiment are set out below:

| $O_2$ concentration/vol % | Ethylene adsorption capacity/μl · g$^{-1}$ |
|---|---|
| 10 | 3500 |
| 4 | 3600 |
| 2 | 3800 |
| 1 | 3700 |
| 0 | 6050 |

Example 3

Ethylene Adsorption Measurements

Measurements were carried out in at 21° C. with 0.1 g doped support of particle size 250-355 μm. A 1 litre jar was partially evacuated and then filled with 500 ppm ethylene in nitrogen, which mixed with the remaining air, such that the initial $O_2$ concentration was 8.4 vol %.

FIG. 1 illustrates that the Pd doped support adsorbed substantially all of the ethylene over a period of about 12 hours.

The invention claimed is:

1. A method for adsorbing volatile organic compounds (VOCs) derived from organic matter comprising the step of adsorbing the VOCs onto palladium doped hydrogen ZSM-5, wherein the Si:Al ratio of the hydrogen ZSM-5 is less than or equal to 100:1, and wherein the palladium doped hydrogen ZSM-5 is used in an environment comprising less than 10 vol % of oxygen.

2. The method according to claim 1, wherein the Si:Al ratio of the hydrogen ZSM-5 is from 22:1 to 28:1.

3. The method according to claim 1, wherein the organic matter consists of perishable organic goods.

4. The method according to claim 3, wherein the perishable organic goods comprise items of food.

5. The method according to claim 4, wherein the items of food comprise fruit and/or vegetables.

6. The method according to claim 3, wherein the perishable organic goods comprise horticultural produce.

7. The method according to claim 6, wherein the horticultural produce comprises plants and/or cut flowers.

8. The method according to claim 1, wherein the organic matter comprises refuse.

9. The method according to claim 1, wherein the organic matter is contained in a storage container or package.

10. The method according to claim 9, wherein the palladium doped hydrogen ZSM-5 is incorporated into, or into part of, the storage container or package.

11. The method according to claim 9, wherein the palladium doped hydrogen ZSM-5 is incorporated into a label comprising a substrate for insertion and retention within a storage container or package.

12. The method according to claim 9, wherein the storage container or package is a refuse receptacle.

13. The method according to claim 1, wherein the VOCs are adsorbed at a temperature of from −10° C. to 50° C.

14. The method according to claim 13, wherein the VOCs are adsorbed at a temperature of from 0° C. to about 40° C.

15. The method according to claim 1, wherein the VOCs comprise ethylene.

16. The method according to claim 1, wherein the VOCs comprise formaldehyde and/or acetic acid.

17. The method according to claim 1, wherein the palladium comprises from 0.1 wt % to 10.0 wt % based on the total weight of the doped hydrogen ZSM-5.

18. The method according to claim 17, wherein the palladium comprises from 0.5 wt % to 5.0 wt % based on the total weight of the doped hydrogen ZSM-5.

19. The method according to claim 1, wherein the environment is a controlled atmosphere or modified atmosphere environment.

20. The method according to claim 1, wherein the oxygen is present in the range between ≥0.5 vol % and <10 vol %.

21. The method according to claim 1, wherein the VOCs are adsorbed to a level of less than or equal to 0.10 ppm.

22. The method according to claim 21, wherein the VOCs are adsorbed to a level of less than or equal to 0.05 ppm.

23. The method according to claim 1, wherein the palladium doped hydrogen ZSM-5 is heated to 250° C. for 30 minutes in air to release the VOCs adsorbed on the palladium doped hydrogen ZSM-5 and any secondary compounds present, thus regenerating the palladium doped hydrogen ZSM-5 for further use.

24. The method according to claim 1, wherein the palladium doped hydrogen ZSM-5 is used with a VOC indicator.

25. The method according to claim 1, wherein the palladium doped hydrogen ZSM-5 is in the form of a label, sachet or ink, or coated onto or in a catalyst carrier, or in the form of extrudates, pellets, tablets, grains or granules, or is incorporated into a packaging material.

26. The method according to claim 14, wherein the VOCs are adsorbed at a temperature of from 0° C. to about 30° C.

* * * * *